United States Patent

Siessegger et al.

(10) Patent No.: US 10,462,875 B1
(45) Date of Patent: Oct. 29, 2019

(54) SYSTEM AND METHOD OF DYNAMIC COLOR ADJUSTMENT

(71) Applicants: Bernhard Siessegger, Unterschleissheim (DE); Richard C. Garner, Arlington, MA (US); Helmar Adler, Danvers, MA (US)

(72) Inventors: Bernhard Siessegger, Unterschleissheim (DE); Richard C. Garner, Arlington, MA (US); Helmar Adler, Danvers, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 16/398,390

(22) Filed: Apr. 30, 2019

Related U.S. Application Data (63) Continuation of application No. 16/120,626, filed on Sep. 4, 2018, now Pat. No. 10,327,303.

(51) Int. Cl.
*H05B 37/02* (2006.01)
*H05B 33/08* (2006.01)
*H05B 41/44* (2006.01)

(52) U.S. Cl.
CPC ..... *H05B 33/0869* (2013.01); *H05B 33/0845* (2013.01); *H05B 33/0851* (2013.01); *H05B 37/0218* (2013.01); *H05B 41/44* (2013.01)

(58) Field of Classification Search
CPC .. H05B 37/02; H05B 37/029; H05B 37/0218; H05B 33/0803; H05B 33/0872; H05B 33/0857; H05B 33/0842; H05B 33/0845; H05B 33/0851; H05B 33/0854; H05B 33/086; H05B 33/0869; F21V 23/0457; F21V 23/003; F21V 23/0464; F21Y 2113/00; F21Y 2115/10
See application file for complete search history.

(56) References Cited

U.S. PATENT DOCUMENTS

| | | | | |
|---|---|---|---|---|
| 5,701,058 A * | 12/1997 | Roth | ................... | H05B 37/0218 250/214 D |
| 7,014,336 B1 * | 3/2006 | Ducharme | ......... | H05B 33/0857 362/231 |
| 7,572,028 B2 * | 8/2009 | Mueller | ................. | A45D 42/10 362/125 |

(Continued)

*Primary Examiner* — Haissa Philogene
(74) *Attorney, Agent, or Firm* — Yutian Ling (57) ABSTRACT

A method for controlling a chromaticity of total light provided by a lighting system includes detecting the total light by a sensor system, determining a component of the total light that is attributable to uncontrolled light, and selecting a calibration for a sensor based on the uncontrolled light, and using the calibration to adjust the output of the sensor system. The calibration tables may be based on spectral responsivity of the sensors in the sensor system and calibration functions rather than physical light sources. Relative intensities of controllable light sources having different xy values are then adjusted to cause the total light provided by the lighting system to approximate a target chromaticity. A daylighting system implementing this method includes controllable light sources with different xy values. The intensities of the controllable light sources are adjusted to augment sunlight to control the chromaticity of total light provided by the daylighting system.

20 Claims, 5 Drawing Sheets

(56) References Cited

U.S. PATENT DOCUMENTS

| | | | | |
|---|---|---|---|---|
| 7,573,209 B2* | 8/2009 | Ashdown | ........... | H05B 33/0818 |
| | | | | 315/149 |
| 9,521,721 B2* | 12/2016 | Beczkowski | ...... | H05B 33/0866 |
| 9,955,551 B2* | 4/2018 | Spero | ....................... | B60Q 1/04 |
| 9,974,141 B2* | 5/2018 | Simonian | ........... | H05B 33/0872 |
| 10,327,303 B1* | 6/2019 | Siessegger | ......... | H05B 33/0851 |

* cited by examiner

SYSTEM AND METHOD OF DYNAMIC COLOR ADJUSTMENT

CROSS-REFERENCE TO RELATED APPLICATIONS

This application is a continuation of U.S. patent application Ser. No. 16/120,626, entitled "System and Method of Dynamic Color Adjustment," filed Sep. 4, 2018, which is hereby incorporated by reference in its entirety.

TECHNICAL FIELD

This present application relates to a system and method of dynamic color adjustment by a lighting system, in which the total light provided by the lighting system is a blend of light from one or more uncontrollable light sources and one or more controllable light sources. In some embodiments, the lighting system is a daylighting system and the one or more uncontrollable light sources includes the sun.

BACKGROUND

Natural skylight is uncontrolled, and the chromaticity of the light provided by the sun may vary considerably. For example, the chromaticity of light provided on an overcast day may be significantly different than the chromaticity of the light provided on a cloudless day. Likewise, the chromaticity of the light may vary considerably depending on the geographical location in which the lighting system is deployed, the month of the year, time of day, environmental factors, and the configuration of the optical system that collects the light.

SUMMARY

All examples and features mentioned below may be combined in any technically possible way.

Implementations disclosed herein include a method of controlling chromaticity of total light in a space, including detecting the total light in the space by a sensor system, the total light including controlled light produced by a plurality of controllable light sources under the control of a lighting system, and uncontrolled light produced by at least one uncontrollable light source not under the control of the lighting system, outputting a detected light signal from the sensor system based on the detected light, the detected light signal including a controlled light signal component due to the controlled light and an uncontrolled light signal component due to the uncontrolled light, isolating the controlled light signal component from the detected light signal based on electrical properties currently being used to control the plurality of controllable light sources, subtracting the controlled light signal component from the detected light signal to determine the uncontrolled light signal component, dynamically selecting one of a plurality of calibration tables based on the uncontrolled light signal component, in which each of the plurality of calibration tables describes a chromatic sensing response of the sensor system when the sensor system is exposed to incident light having different characteristics, calibrating the uncontrolled light signal component based on the selected calibration table, determining a chromaticity of the detected light based on the calibrated uncontrolled light signal component and the controlled light signal component, and adjusting the electrical properties of the plurality of controllable light sources to adjust the chromaticity of the total light provided by the lighting system to approximate a target chromaticity.

In some embodiments, at least two of the controllable light sources in the plurality of controllable light sources have different xy chromaticities. In some embodiments, isolating the controlled light signal component from the detected light signal includes determining a chromaticity of the plurality of controllable light sources from the electric properties currently being used to control the plurality of controllable light sources. In some embodiments, a mapping table stores a plurality of electric properties that may be applied to the plurality of controllable light sources and the resultant chromaticity. In some embodiments, the plurality of calibration tables are formed using calibration functions representing non-physically real calibration sources. In some embodiments, the calibration functions are Planck functions at different temperatures. In some embodiments, dynamically selecting one of the plurality of calibration tables further includes determining an approximate power spectrum density of the uncontrolled light from uncontrolled light signal component. In some embodiments, the selected calibration table is formed using a calibration function having a power spectrum density similar to the determined approximate power spectrum density of the uncontrolled light. In some embodiments, the at least one uncontrollable light source includes the sun.

Further implementations disclosed herein include a lighting control unit for a lighting system, the lighting system includes a plurality of controllable light sources, the lighting control unit including a light separation unit configured to receive an output signal of the lighting control unit, the output signal used to control light output of the plurality of controllable light sources, receive a total light signal from a sensor system, and use the output signal to separate the total light signal into an uncontrollable light signal representing uncontrollable light from at least one uncontrollable light source and a controllable light signal representing light from the plurality of controllable light sources, a calibration selector configured to select a calibration table from a plurality of calibration tables, in which each of the plurality of calibration tables is associated with different uncontrolled lighting conditions, and a tuner module configured to receive a calibrated uncontrollable light signal produced by applying the calibration table to the uncontrollable light signal, adjust the output signal based on the calibrated uncontrollable light signal and the controllable light signal to provide total light approximating a target chrominance value.

In some embodiments, the light separation unit is further configured to use the output signal to key into a table mapping the output signal to controlled light chrominance values to determine the controllable light signal. In some embodiments, the plurality of calibration tables are formed using calibration functions representing non-physically real calibration sources and the spectral responsivity of the sensor. In some embodiments, the calibration functions are Planck functions at different temperatures. In some embodiments, the calibration selector is further configured to evaluate the uncontrollable light signal to determining an approximate power spectrum density of the at least uncontrolled light source. In some embodiments, the calibration selector is further configured to select one of the plurality of predetermined calibration tables that was formed using a calibration function having a power spectrum density similar to the determined approximate power spectrum density of the at least one uncontrollable light source. In some embodiments, the at least one uncontrollable light source includes the sun.

In some embodiments, at least two of the controllable light sources have different xy chromaticities.

Further implementations disclosed herein include a method of controlling a chromaticity of total light in a space, including outputting, by a sensor system, a detected light signal based on the total light detected in the space, the detected light signal including a controlled light signal component produced by light from a plurality of controllable light sources, and an uncontrolled light signal component produced by light from at least one uncontrollable light source, isolating, by a control system, the controlled light signal component from the detected light signal based on a current light setting of the plurality of controllable light sources, subtracting, by the control system, the controlled light signal component from the detected light signal to determine the uncontrolled light signal component, dynamically selecting, by the control system, a calibration table from a plurality of calibration tables based on the uncontrolled light signal component, in which each of the plurality of calibration tables is associated with different uncontrolled lighting conditions, calibrating, by the control system, the uncontrolled light signal component using the selected calibration table, and adjusting, by the control system, the light settings of the plurality of controllable light sources to achieve a target chromaticity of the total light based on the calibrated uncontrolled light signal component and the controlled light signal component.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing.

DETAILED DESCRIPTION

This disclosure is based, at least in part, on the realization that it would be advantageous to provide a lighting system in which one or more controllable light sources are able to be accurately controlled to adjust for variations in naturally provided uncontrolled sunlight.

Figure 1:
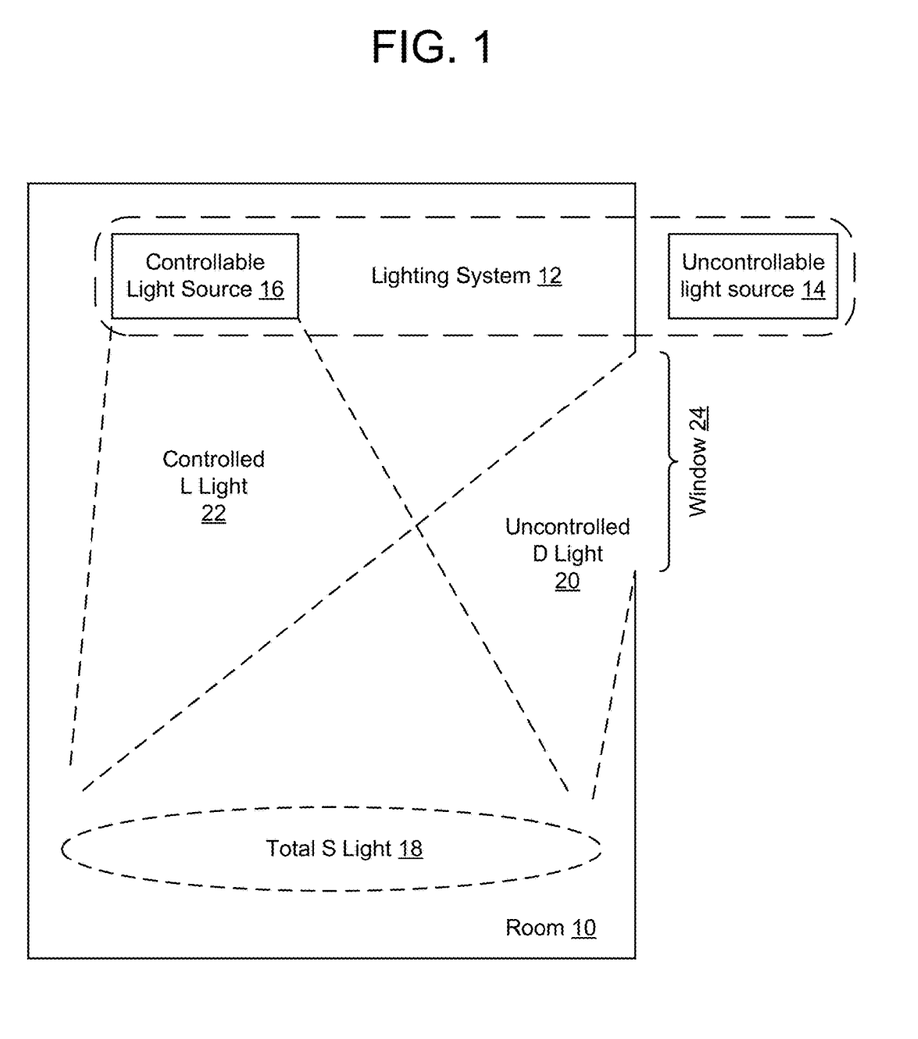
FIG. 1 is a diagram of a room having a lighting system, in accordance with some embodiments of the present disclosure.

FIG. 1 is a diagram of a room 10 having a lighting system 12. The lighting system 12 includes one or more uncontrollable light sources 14 and one or more controllable light sources 16. The total S light 18 provided by the lighting system 12 includes a contribution of uncontrolled D light 20 received from the uncontrollable light sources 14 and controlled L light 22 received from the controllable light sources 16. As discussed in greater detail below, the notion "S" refers to the total System light, which includes light from the uncontrollable light sources 14 as well as light from the controllable light sources 16. The notation "D" refers to Daylight, or in general to light from any uncontrollable light source 14, and the notation "L" refers to Luminaire, or in general to light from any controllable light sources 16 that are controlled by the components of the lighting system 12.

In some embodiments, the uncontrollable light sources 14 includes the sun and light from light sources that are not controlled by the components of the lighting system 12. Uncontrollable light sources 14 may include artificial light sources such as LEDs, fluorescent lights, or other light sources, that are not directly controlled by the components of the lighting system 12. In a "daylighting system", as that term is used herein, at least one of the uncontrollable light sources 14 is the sun. Uncontrolled D light 20 may be generated by light sources within the room 10 or external to the room 10. Where the uncontrolled D light 20 includes light from the sun (direct and/or scattered light), the uncontrolled D light 20 may enter the room 10 through a window 24, light conduit, solar duct, or another structure designed to bring sunlight into the room 10.

In some embodiments the controllable light sources 16 include artificial light sources such as LEDs, fluorescent lights, or other light sources, that have light intensities that are adjustable and are directly controlled by the components of the lighting system 12. In some embodiments, the controllable light sources have different chromaticities, so that by independently varying the intensity of light produced by the controllable light sources 16, the total chromaticity of the total S light 18 is adjusted. In some embodiments, the components of the lighting system 12 adjust electrical characteristics of inputs to the controllable light sources 16, to adjust the intensity of light produced by those controllable light sources 16, and therefore control the overall chromaticity of the controlled L light 22.

Figure 2:
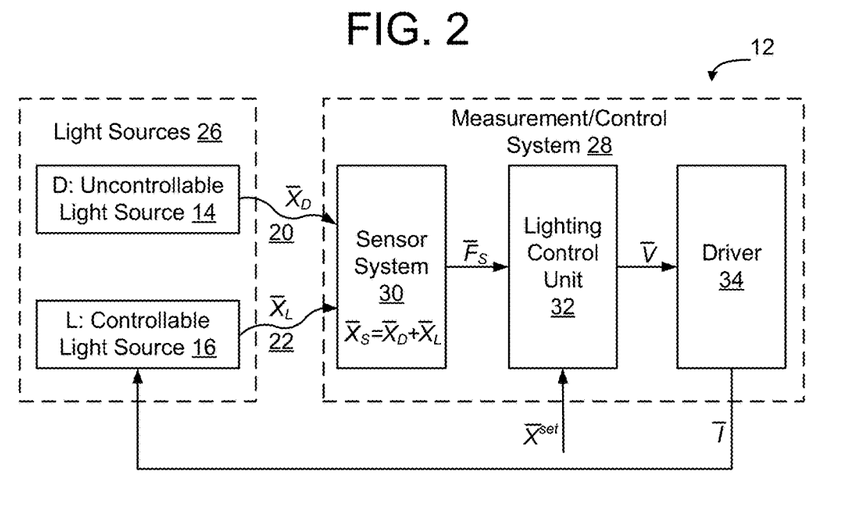
FIG. 2 is a functional block diagram of an example lighting system, in accordance with some embodiments of the present disclosure.

FIG. 2 is a functional block diagram showing the lighting system 12 in greater detail. As shown in FIG. 2, in some embodiments the lighting system 12 includes a set of light sources 26 including the uncontrollable light sources 14 and controllable light sources 16 discussed above. The lighting system 12 also includes a measurement/control system 28 configured to measure the total S light 18 and control the controllable light sources 16 to control the quality of the controlled L light 22 provided by the controllable light sources 16. Thus, measurement/control system 28, in some embodiments, provides a closed loop feedback control system configured to adjust the controlled L light 22 to enable the lighting system 12 to provide light having an intended target light chromaticity as the uncontrolled D light 20 changes over time.

As shown in FIG. 2, in some embodiments, measurement/control system 28 includes a sensor system 30 (a set of sensors with different spectral responsivities covering the visible range), a lighting control unit 32, and a driver 34. In some embodiments, the sensor system 30 detects the total S light 18 in the room 10, and outputs a set of values, arranged in a vector format and designated $\overline{F}_S$. Each component of $\overline{F}_S$ is the integral of the power spectral density of the light weighted by the spectral responsivity of the respective sensor. The vector $\overline{F}_S$ is called a pseudo-chromaticity from which the chromaticity may be derived with a suitable transformation, as discussed below. In FIG. 2 the true chromaticity of the total S light 18 is designated as $\overline{x}_S$, which is the sum of the chromaticity $\overline{x}_L$ of the controlled light 22, and the chromaticity $\overline{x}_D$ of the uncontrolled light.

The output of the sensor system 30, designated as $\overline{F}_S$, is provided to the lighting control unit 32 and used by the lighting control unit 32 to adjust the chromaticity through adjustment of the intensities of the controlled L light 22 output by the controllable light sources 16. Since the controlled light sources 16 have different chromaticities, adjusting the relative intensities of the controlled light sources 16 enables the overall chromaticity of the controlled L light 22 to be adjusted. By adjusting the chromaticity of the controlled L light 22, the uncontrolled D light 20 is supplemented so that the total S light 18 in the room is able to be maintained at a consistent chromaticity, or adjusted to some other desired target chromaticity, as the uncontrolled D light 20 varies over time.

In some embodiments, the lighting control unit 32 is provided with information about intended light characteristics $\overline{X}^{set}$ within the room 10, and adjusts the output signals $\overline{\nabla}$ to driver 34 to cause the driver 34 to adjust input signals $\overline{I}$ to the controllable light sources 16. The ability of the lighting control unit 32 to accurately do this depends on calibration of the sensor system 30. If the sensor system 30 does not accurately determine the chromaticity of the total S light 18, the measurement/control system 28 is not able to accurately control the controllable light source 16 to drive the total S light 18 to match the target intended light characteristics in the room 10.

In some embodiments the sensor system 30 is implemented using one or more color sensors, which enable the color of the light and the intensity of the total S light 18 in the room 10 to be determined. Color sensors are commercially available common devices and accordingly, a detailed technical description of the implementation of the color sensor has not been provided.

The interpretation of the color (e.g., the chromaticity coordinates, the CCT, or other related quantities) from the measurements acquired by the sensor system 30, in general, requires a calibration. While no calibration is necessary if the sensor system 30 has three sensors whose responsivities exactly match respectively the three tri-stimulus functions, this is usually not the case for a real system.

Further, any particular calibration is optimized for a class of power spectral densities that are similar in character to those used in creating the calibration. For example, if a calibration is performed using a set of blackbody light sources with different temperatures, then the calibration is exact if the light under test is one of those blackbodies or a linear combination thereof. It is not exact but may be suitably accurate if the light under test is a blackbody with temperature different from any of the calibration blackbodies. It is not accurate if the light under test is far from blackbody-like (that is, well off the blackbody locus in the chromaticity diagram). Similarly, if the calibration is performed using a set of light sources that are not blackbodies, the calibration will be exact if the light under test is one of those light sources or a linear combination of the calibration light sources. It is not exact, but fairly accurate, if the light under test is a small variation from any one of the calibration light sources. The calibration is not accurate, however, if the light under test is far from any of those light sources or linear combinations of them in chromaticity space.

Thus, if the spectral makeup of the light varies widely, which is likely in a system that incorporates daylight as one of the uncontrollable light sources 14, then a particular calibration may not be suitable over the entire range of light experienced by the system. This may cause large errors in the subsequent adjustment of the controllable light sources 16 by the lighting control unit 32, which may cause the color and intensity of the total S light 18 provided within the room 10 to be significantly different than the intended target color and intensity.

According to some embodiments, the lighting control unit 32 includes a calibration selector 36 (see FIG. 3) that dynamically selects a calibration table 38 based on the state of the lighting system 12 at the current moment. Namely, the lighting control unit 32 chooses the calibration table 38 based on the state of the uncontrolled D light 20 to which the sensors of the sensor system 30 are currently exposed. In this way, the calibration used to interpret the output of the sensors of the sensor system 30 is chosen dynamically and optimally to suit the measurement. By enhancing the manner in which the sensor's response to the uncontrolled D light 20 is processed, the lighting system 12 is more accurately able to control the controllable light sources 16 to cause the total S light 18 of the lighting system 12 to match the intended target color and intensity while the uncontrolled D light 20 varies over time.

The spectral sensitivity of an optical sensor system 30 typically does not match the sensitivity of the human eye. For any given spectrum, it is possible to determine a color calibration so that the processed sensor data gives the color coordinates/tri-stimuli values that actually match the real color coordinates/tri-stimuli values for this particular spectrum.

But if there is a change in the spectrum of the light shining on the sensor system 30, the color coordinates/tri-stimuli values of the processed sensor data (using the earlier established color calibration) may deviate from the true color coordinates/tri-stimuli values (belonging to this modified spectrum).

The light output by each of the light sources has associated with it a set of chromaticity quantities, which are conventionally designated X, Y, Z, x, y, u, v, and Correlated Color Temperature (CCT). For convenience, the most basic ones of this set will be considered, which are designated by (uppercase letters) X, Y, Z. For simplicity of notation in what follows, these chromaticity quantities will be referred to generically by the 3×1 vector $\overline{X}=(X_1, X_2, X_3)^T$ and $\overline{X}$ will be referred to as the 'chromaticity' of the light. Considering wavelength $\lambda$ to be a large number of n equally spaced, discrete quantities $\lambda_1, \ldots, \lambda_n$ (spanning the visible part of the spectrum), the chromaticity is given by:

$$\overline{X}=\overline{\overline{r}}\cdot\overline{P} \quad (1)$$

where $\overline{\overline{r}}$ is a 3×n matrix whose rows are respectively the three tristimulus functions, and $\overline{P}$ is an n×1 vector of Power Spectrum Density (PSD) values, all evaluated at the n discrete wavelengths. By using a discrete representation of wavelength, integrals over $\lambda$ become summations over i, the index of $\lambda$. Thus, $\int_{\lambda_1}^{\lambda_n} d\lambda \to \Delta\lambda \Sigma_{i=1}^n$ where $\Delta\lambda$ is the difference between adjacent $\lambda$'s. In writing equation (1), and also later expressions involving sums over $\lambda$, the $\Delta\lambda$ will be omitted, as it may be imagined to be absorbed into functions in the integrand (for example, into the tristimulus functions).

The specific chromaticity of the blend of all the uncontrolled D light 20 from the uncontrollable light sources 14 is $\overline{X}_D$ and of all controlled L light 22 from the controllable light sources 16 is $\overline{X}_L$. If the blending is perfectly uniform, then, because of the linearity of the chromaticity with respect to the PSD of the light, the total chromaticity is given by the sum of the chromaticities of its parts. In particular, the blended uncontrolled D light 20 and controlled L light 22 (the total S light 18) has chromaticity $\overline{X}_S=\overline{X}_D+\overline{X}_L$.

According to some embodiments, the measurement/control system 28 adjusts the drives $\overline{I}$, e.g., currents or voltages provided to the controllable light sources 16, to achieve a certain set value $\overline{X}^{set}$ for the total S light 18 $\overline{X}_S$. In some embodiments, the measurement/control system 28 adjusts the drives $\overline{I}$ by measuring the total S light 18. In some embodiments, the measurement/control system 28 measures the uncontrolled D light 20 and controlled L light 22 light separately. In either instance, according to some embodiments, the manner in which the output of the sensor system 30 is processed is adjusted based on the spectral characteristics of the uncontrolled D light 20, by selecting a calibration table 38 to be used to interpret the output of the sensor system 30 depending on the current PSD of the uncontrolled D light 20.

As shown in FIG. 2, the measurement/control system 28 includes a sensor system 30, a lighting control unit 32, and a driver 34. The sensor system 30 includes N≥1 sensor(s) 30, each of which detects the total S light 18 in the room 10 from the lighting system 12. The responses (e.g., voltage outputs) of the sensors of the sensor system 30 are designated by $\overline{F}_S = (F_{S1}, F_{S2}, \ldots, F_{SN})^T$.

The components of $\overline{F}_S$ are the actual measurements available to, and used by, the lighting control unit 32, as discussed below. The actual measurements may be related to more fundamental quantities as follows.

The spectral response of the $k^{th}$ sensor of the sensor system 30 will be denoted as $f_k(\lambda)$. Considering discrete $\lambda$, as before, it is possible to denote the spectral responses of all the sensors of the sensor system 30 collectively by the N×n matrix $\overline{\overline{f}}$, where each row of $\overline{\overline{f}}$ is the spectral response for one of the sensors of the sensor system 30. Therefore, the responses of the sensors of the sensor system 30 are given, generically, by:

$$\overline{F} = \overline{\overline{f}} \cdot \overline{P} \quad (2)$$

Note the similarity in form of Equations (1) and (2). Thus, there is an analogy between the $\overline{\overline{f}}$ matrix and the tristimulus $\overline{\overline{r}}$ matrix, as well as between the measurements $\overline{F}$ and the chromaticity $\overline{X}$.

Figure 3:
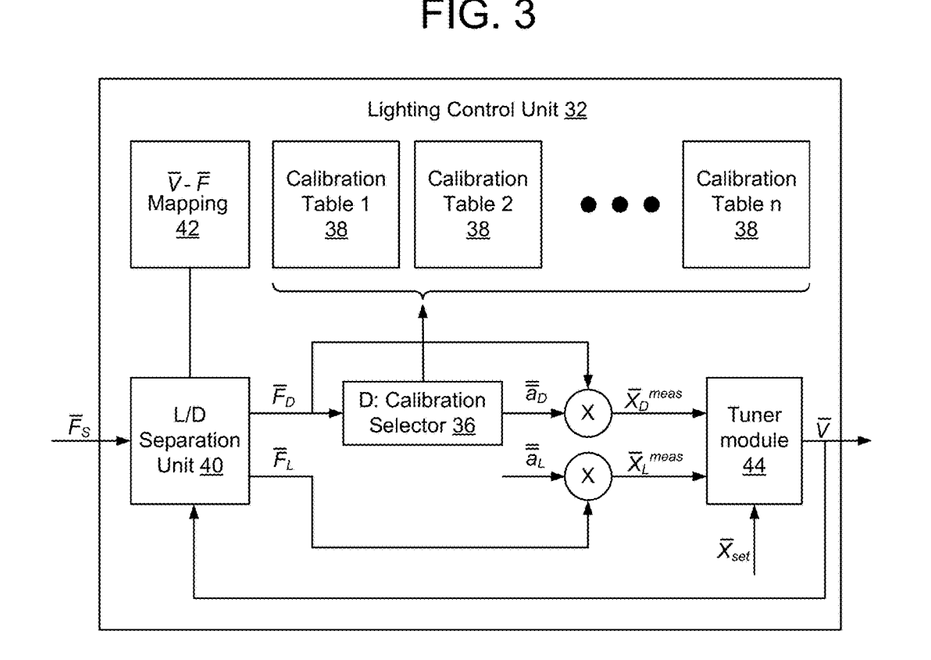
FIG. 3 is a functional block diagram of an example lighting control unit, in accordance with some embodiments of the present disclosure.

FIG. 3 is a schematic diagram of the lighting control unit 32. The lighting control unit 32 receives measurements $\overline{F}_S$ from the sensor system 30, and the chromaticity set point $\overline{X}^{set}$ and determines the control signals $\overline{V}$ to send to the driver 34. The driver 34 then adjusts, by way of drives $\overline{I}$, the controllable light sources 16 to adjust the lighting system 12 chromaticity to match the intended chromaticity $\overline{X}^{set}$. The control signals $\overline{V} = (V_1, \ldots, V_p)^T$, where p is the number of controllable light sources 16, may be, for example, dimming voltages corresponding to each of the controllable light sources 16. The drives $\overline{I} = (I_1, \ldots, I_p)^T$ may be, for example, the operating currents of the controllable light sources 16. If the controllable light sources 16 have different chromaticities, adjusting the relative intensities of the controllable light sources 16 results in adjustment of the overall chromaticity of the total S light 18 provided by the lighting system 12.

In some embodiments, as shown in FIG. 3, the sensor system 30 measures the total S light 18 $\overline{F}_S$. The lighting control unit 32 receives the outputs $\overline{F}_S$ of the sensor system 30 and passes the received signals from the sensor system 30 to an L/D separation unit 40. The L/D separation unit 40 separates the measurement of the total S light 18 into its constituent parts, $\overline{F}_L$ and $\overline{F}_D$, where $\overline{F}_L$ is the output of the sensor system 30 due to measurement of controlled L light 22 provided by the controllable light sources 16, and $\overline{F}_D$ is the output of the sensor system 30 output due to measurement of uncontrolled D light 20 provided by the uncontrollable light sources 14.

In some embodiments, the choice of calibration (transformation from $\overline{F}$ to $\overline{X}$) is dependent on the spectral character of the uncontrolled D light 20, which may be significantly different than the spectral character of the controlled L light 22. By separating the uncontrolled D light 20 from the controlled L light 22, it is easier to ascertain the PSD of the uncontrolled D light 20 to facilitate selection of the correct calibration table 38 to be used to process the output of the sensor system 30 to determine the true chromaticity of the uncontrolled D light 20.

In some embodiments, the L/D separation unit 40 uses the controls $\overline{V}$ to achieve the separation.

In some embodiments the L/D separation unit 40 uses a $\overline{F}$-$\overline{V}$ mapping table 42 and the current state of control signals $\overline{V}$ to determine the chromaticity $\overline{F}$ of the controlled L light 22. In some embodiments, the $\overline{F}$-$\overline{V}$ mapping table 42 is created during a calibration phase of the lighting system 12, by adjusting the controls $\overline{V}$ to each of the controllable light sources 16 and determining the responses $\overline{F}$ of the sensor system 30 for each state of control $\overline{V}$.

Because the L/D separation unit 40 knows the response $\overline{F}_L$ of the sensor system 30 to light produced by the controllable light sources 16 for each possible control value $\overline{V}$, the L/D separation unit 40 uses the current control value $\overline{V}$ output from the lighting control unit 32 to determine the contribution of the controlled L light 22 to the total S light 18 currently being sensed by the sensor system 30. By subtracting the response of the sensor system 30 from the contribution of the controlled L light 22 being provided by the controllable light sources 16 from the response of the sensor system 30 to the total S light 18 sensed by the sensor system 30, the L/D separation unit 40 isolates the response of the sensor system 30 to the uncontrolled D light 20 from the response of the sensor system 30 to the controlled L light 22.

In some embodiments, the L/D separation unit 40 receives the current control $\overline{V}$ that is being used to control operation of the controllable light sources 16. Using this value, the L/D separation unit 40 reads the sensor response $\overline{F}$ from the $\overline{F}$-$\overline{V}$ mapping table 42 to determine the portion $\overline{F}_L$ of the total sensor response $\overline{F}$ that is attributable to the current operating conditions of the controllable light sources 16. This value is then subtracted from the total sensor response $\overline{F}$ to determine the portion of the signal $\overline{F}_D$ provided by the sensor system 30 that is attributable to the sensor system 30 detecting uncontrolled D light 20.

In some implementations, the $\overline{F}$-$\overline{V}$ mapping table 42 contains the following values:

$$\overline{F}_{Lk} = V_k \times (\overline{\overline{f}} \cdot \hat{P}_{Lk})(k=1, \ldots, p) \quad (3)$$

where $\hat{P}_{Lk}$ is the Power Spectrum Density (PSD) of the $k^{th}$ source of the set of controllable light sources 16 when $V_k = 1$, $\overline{F}_{Lk}$ are the responses for any $V_k$ and p is the number of light sources in the set of controllable light sources 16. Therefore, $$\overline{F}_L = \sum_{k=1}^{p} \overline{F}_{Lk} \quad (4)$$

$$\overline{F}_D = \overline{F}_S - \overline{F}_L$$

The same calibration of the controllable light sources 16 provides exact values (to within experimental error) for the chromaticities of each controllable light source 16 as well as for the blended set of controllable light sources 16. This is represented in FIG. 3 by the product of a (known) $\bar{\bar{a}}_L$ matrix and the separated controlled L light 22 $\overline{F}_L$ as obtained by the above procedure.

Once the total S light 18 has been separated by L/D separation unit 40, the response of the sensor system 30 to the uncontrolled D light 20 is passed to a calibration selector 36 which selects a calibration transformation $\bar{\bar{a}}_D$ from the set of calibration tables 38 based on the measured uncontrolled D light 20 detected by the sensor system 30. As used herein, the term 'calibration' is used to refer to the transformation of the N measurements $\overline{F}$ to the 3 chromaticity values $\overline{X}^{meas}$, where the superscript 'meas' is included to indicate that these values will be, in general, different from the true chromaticity $\overline{X}$. In its most general form, the transformation would be represented as $$\overline{X}^{meas} = \overline{G}(\overline{F}) \tag{5}$$

where $\overline{G}$ represents a vector of three functions. This form allows for the consideration of nonlinear transformations. However, for ease of explanation, a linear transformation will be described in which the linear transformation is represented by a matrix $\bar{\bar{a}}$ (with dimensionality 3×N), which provides reasonably good performance. In the case of a linear transformation, equation (5) may be represented as follows:

$$\overline{X}^{meas} = \bar{\bar{a}} \cdot \overline{F} \tag{6}$$

It is of course desirable to have a transformation $\bar{\bar{a}}$ which gives an $\overline{X}^{meas}$ that is suitably close to the true chromaticity value $\overline{X}$. According to some embodiments, instead of using a single matrix $\bar{\bar{a}}$ determined beforehand with a specific set of calibration light sources, a number of different calibration tables 38 ($\bar{\bar{a}}$'s) are constructed and used by the measurement/control system 28 to be dynamically chosen at the time of measurement depending on the characteristics of the uncontrolled D light 20 at the time of measurement. As described in greater detail below, in some embodiments the calibration tables 38 are not based on physically real calibration light sources.

The calibration table 38 $\bar{\bar{a}}$ in some embodiments is a matrix and is chosen from a number of previously created matrices according to the spectral character of the Power Spectrum Density (PSD) of the uncontrolled D light 20 that is currently being measured by the sensor system 30. Because the lighting system 12 relies on a finite number of measurements $\overline{F}_S$, it does not have access to the exact spectrum, and this will lead to deviations between measured and true chromaticities.

Two sources of uncertainty in spectral character of the total S light 18 detected by sensor system 30 are 1) the relative amounts of uncontrolled D light 20 and controlled L light 22, and 2) the nature of the uncontrolled D light 20. For example, if uncontrolled D light 20 is daylight, then the uncontrolled D light 20 may include an unknown combination of direct and scattered sunlight. The scattered sunlight may be Rayleigh scattered light from air molecules and/or Mie scattered light from atmospheric aerosols, various types of clouds, rain, snow, etc. As discussed herein, using L/D separation unit 40, it is possible to reduce the first of these uncertainty sources, by separating the total S light 18 measured by the sensor system 30 into its constituent parts. Thus, the calibration selector 36 has a lesser burden in selecting a transformation, since it considers just variations of the uncontrolled D light 20, and not attempt to simultaneously consider the potentially very different controlled L light 22 and uncontrolled D light 20.

The calibration table 38 $\bar{\bar{a}}$ chosen by calibration selector 36 is designated $\bar{\bar{a}}_D$ and one possible selection procedure is discussed below in the section under the heading "Determining Calibration Matrixes." The $\bar{\bar{a}}_D$ thus chosen is then multiplied by the sensor response to the uncontrolled D light 20 ($\overline{F}_D$), to obtain the measured chromaticity of the uncontrolled D light 12 $\overline{X}_D^{meas}$. The total (measured) chromaticity for the total S light 18 is then $\overline{X}_S^{meas} = \overline{X}_L^{meas} + \overline{X}_D^{meas}$. These quantities are passed to the tuner module 44 of the lighting control unit 32, which then determines the controls $\overline{V}$ to adjust the controllable light sources 16 so that $\overline{X}_S^{meas}$ becomes $\overline{X}^{set}$ to within acceptable error. One way of determining a set of calibration tables 38 is discussed below in the section entitled "Determining Calibration Matrixes". One way of adjusting the controls V to adjust the controllable light sources 16 to cause the total S light 18 of the lighting system 12 to approach an intended chromaticity value is discussed below in the section entitled "Determining Output Voltage Of Tuner Module To Adjust Total S Light Chromaticity".

Determining Calibration Matrixes

A sensor system 30 includes one or more optical sensors (i.e., a light detector and a filter) which, utilizing a prior calibration with physically real light sources, provides the conventional chromaticity quantities (e.g., X, Y, Z, x, y, u, v, CCT, etc.) from measurements acquired by the sensor system 30. Ideally, such a sensor system 30 would have three optical sensors with spectral responses which perfectly match respectively the three tri-stimulus functions. Since practical limitations preclude an exact match of this nature, calibrations are performed which give reasonably accurate results, at least when the sensor system 30 is used to measure a light source that has characteristics that are similar to the characteristics of the light sources that were used to perform the calibration. However, if the light source that is to be measured has somewhat different characteristics than the light sources that were used to perform the calibration, then it is likely that the output of the sensor system 30 will not be accurate or, at least, large uncertainties render the results questionable.

In some embodiments, a set of calibration tables 38 is created that do not rely on physically real calibration light sources, but rather rely on synthetically-generated calibration functions. As such, the functions may be chosen to produce optimal values of the chromaticity quantities for the given measurement conditions. Since physically real light sources are not used, the procedure is not subject to the physical limitations of such light sources. Likewise, the fact that such light sources may not exist or be able to be created does not prevent creation of a calibration table 38 based on such non-physically real light source.

Calibration of a sensor system 30 typically includes (1) exposing the sensor system 30 to one or more physically-real calibration light sources light sources, such as an incandescent lamp, (2) adjusting the operating conditions of the calibration light sources such as by changing the amount current is input to the incandescent lamp, (3) measuring the responses of each of the sensors of the sensor system 30 to each light source of the set of calibration light sources, (4) measuring the "true" chromaticity values of those light sources with a different system (e.g., calibrated spectrometer), and (5) deriving a matrix of coefficients that transform the measured values to the true values. In this way, the derived transformation is exact for the calibration light sources, or for any linear combination of those sources. If a sensor system 30 that has been calibrated using this procedure is then used to measure light having a PSD that is significantly different than the PSD of the calibration light source, the chromaticity indication output by the sensor system 30 may deviate from the actual chromaticity. This error may be considerable if the light source to be measured differs significantly from the calibration set.

In some embodiments, a calibration procedure for a sensor system 30 relies on knowledge of the spectral responsivity of the sensor system 30, but does not otherwise require use of physically real light sources for obtaining the calibrated chromaticity quantities from measurements made by the system. Consideration of these responsivities alone may be adequate for most measurements of interest (i.e., no further calibration is necessary), but additional accuracy may be obtained by considering in addition a set of one or more calibration functions. The functions may be arbitrary, but are chosen in a way to optimize for the experimental conditions (i.e., the expected spectrum of the light under measurement and the spectral responsivities of the sensors of the sensor system 30). Although the calibration procedure may be done at any time after the measurements are made, the procedure is well-suited to dynamic determination of the chromaticity values, whereby a best set of calibration functions is chosen dependent on the present measurements by the sensor system 30.

The procedure considers the measurements, $\bar{F}$, of a sensor system 30 and specifies a transformation which produces the "best" values of the chromaticity quantities, $\bar{X}$, from these measurements. The measurements are expressed by the vector $\bar{F}=(F_1, F_2, \ldots, F_M)^T$, whose M components (M≥1) are the responses of the M sensors that are included in the sensor system 30. The chromaticity vector $\bar{X}=(X_1, X_2, X_3)^T$, is a vector whose three components represent the chromaticity quantities that are conventionally designated as (uppercase) X, Y, Z. They are designated here as $X_1$, $X_2$, $X_3$ for simplicity of notation in this section of the disclosure.

Consider light with some Power Spectrum Density (PSD), $P(\lambda)$, to be the subject of measurement. $\lambda$ is the continuous variable representing wavelength, however, for simplicity, and with no loss of generality, it will be replaced with a vector of n equally spaced, discrete wavelengths. Thus, the PSD becomes a vector, $\bar{P}=(P_1, P_2, \ldots, P_n)^T$, where $P_i=P(\lambda_i)$. It is imagined that n is a large number and therefore adjacent $\lambda_i$ are close together. The true XYZ chromaticity quantities of this light are given by equation 7:

$$\bar{X}=\bar{r}\cdot\bar{P} \quad (7)$$

where the 3×n matrix $\bar{r}$ contains the three tri-stimulus functions in each of its rows, discretized in $\lambda$. (There is a factor $\Delta\lambda=\lambda_i-\lambda_{i-1}$ which is incorporated into $\bar{r}$.) Thus, $r_{ki}$ is the $k^{th}$ tristimulus function evaluated at $\lambda_i$. The measurements of the sensor system 30 are $$\bar{F}=\bar{f}\cdot\bar{P} \quad (8)$$

where the M×n matrix $\bar{f}$ contains the spectral responses of the M sensors of the sensor system 30, again discretized in $\lambda$ (and also containing the factor $\Delta\lambda$). Thus, $f_{ki}$ is the $k^{th}$ response function evaluated at $\lambda_i$. It is considered that $\bar{f}$ is known, obtained perhaps with a spectrometer. Once the sensors of the sensor system 30 are chosen, $\bar{f}$ of course does not change.

The calibration procedure specifies a transformation from F to X. For simplicity and practicality, a linear transformation is considered. Thus, the procedure provides a 3×M matrix $\bar{a}$ with which measured chromaticity quantities, $\bar{X}_{meas}$, are obtained. That is $$\bar{X}_{meas}=\bar{a}\cdot\bar{F} \quad (9)$$

It is desired that the transformation be accurate for all the PSD's of interest. But, in some embodiments, different $\bar{a}$'s are used for different classes of PSD's. Disregarding "class" at this point, to obtain an $\bar{a}$ for all the PSD's of any class, the error function (equation 10) expresses the deviation between the measured and true chromaticity values:

$$\bar{G}(\bar{P}) = \bar{X} - \bar{a}\cdot\bar{F} \quad (10)$$
$$= (\bar{r} - \bar{a}\cdot\bar{f})\cdot\bar{P}$$
$$= \bar{g}\cdot\bar{P}$$

The functional dependence of $\bar{G}$ on $\bar{P}$ is indicative of the fact that this relationship should be considered for all the possibilities of $\bar{P}$ under consideration.

In some embodiments, it is desirable to determine the matrix $\bar{a}$ which minimizes $\bar{G}$ in a least squares sense. It is to be noted, this holds independently for each of the three components of $\bar{G}$. If $\bar{P}$ may be any PSD whatsoever from the infinitude of possibilities (in this case the n>>1 possibilities since $\lambda$ has been discretized into n quantities) then it is sufficient to instead minimize, in a least squares sense, the quantity $\bar{g}=\bar{r}-\bar{a}\cdot\bar{f}$. This implies minimizing each of the three quantities:

$$h_k^2 = \sum_{i=1}^{n} g_{ki}^2 = \sum_{i=1}^{n}\left(r_{ki} - \sum_{j=1}^{N} a_{kj}f_{ji}\right)^2 \quad (11)$$

$(k = 1, 2, 3)$ with respect to the N quantities $a_{kj}$ (j=1, ..., N). After some manipulation, this becomes equivalent to finding the solution to $$\bar{g}\cdot\bar{f}^T=\bar{0} \quad (12)$$

Considering the definition of $\bar{g}$, the "best" $\bar{a}$, for any PSD whatsoever, is obtained using the following equation:

$$\bar{a}_{best}=\bar{r}\cdot\bar{f}^T\cdot(\bar{f}\cdot\bar{f}^T)^{-1} \quad (\bar{P}\text{'s not constrained}) \quad (13)$$

With this expression for the transformation, the deviation between true and measured chromaticity values, $\bar{G}$, is $$\bar{G}_{best} = \bar{r}\cdot\left[\bar{I}^n - \bar{f}^T\cdot(\bar{f}\cdot\bar{f}^T)^{-1}\cdot\bar{f}\right]\cdot\bar{P} \quad (14)$$

($\bar{P}$'s not constrained)

where $\bar{I}^n$ is the n×n identity matrix. It is worthwhile to note that $\bar{G}_{best}=0$ if:

$\bar{f}=\bar{r}$ (in this case, the sensor responsivities are equal to the tristimulus functions), $\bar{f}$ is any n×n matrix with an inverse—i.e., whose rows form an independent set in n dimensional space (in this case there are n sensors of the sensor system 30 that form an independent set of measurements at all wavelengths, which is akin to being a spectrometer that spans wavelength space of interest), $\bar{P}$ is a linear combination of the spectral responsivities (the rows of $\bar{f}$). However, this now constrains $\bar{P}$ and therefore considers it to be of a certain class, which is discussed below.

It may be that the $\bar{a}_{best}$ expressed by equation (13) is good enough, even for certain classes of $\bar{P}$. The check would be to consider all the $\bar{P}$'s of interest and calculate the deviations, as expressed by equation (14). It is important to note that considering this does not require any physically real light sources.

If it is known that the $\bar{P}$'s of interest are of a certain class, then it may be possible to do better than equation (13), in the sense of making $\bar{G}_{best}$ even closer to zero. To entertain the notion of classes of $\bar{P}$, $\bar{P}$ may be considered to be some linear combination of a set of PSD's, which will be referred to herein as "calibration PSD's" or "calibration functions". The calibration functions will be designated $\bar{C}_l$ where $l=1, 2, \ldots, L$ identifies the $l^{th}$ such function. At this point the number, L, of calibration functions is unspecified. Thus:

$$\bar{P} = \sum_{l=1}^{L} \alpha_l \bar{C}_l = \bar{\bar{C}} \cdot \bar{\alpha} \quad (15)$$

where $\alpha_l$ are constants, $\bar{\alpha}$ is the L×1 vector whose components are the $\alpha_l$, and $\bar{\bar{C}}$ is the n×L matrix whose columns are the calibration functions $\bar{C}_l$.

That such an approach is useful is suggested by the fact that if the calibration functions were the set of n unit responses at each wavelength, $\lambda_1$, then any $\bar{P}$ could be represented as a linear combination of such functions, and this would be the limit of no constraints on $\bar{P}$. (The calibration functions could also be any n linearly independent vectors, as was the point brought up by the $3^{rd}$ point in the list above.) Constraining $\bar{P}$ in certain ways then represents an exercise in pairing down the calibration set. In reality there might then be error in representing $\bar{P}$ in the form given by equation (15). This error is designate as $\bar{\Delta}$, and therefore:

$$\bar{P} = \bar{\bar{C}} \cdot \bar{\alpha} + \bar{\Delta} \quad (16)$$

Considering first the possibility of no such error, insert equation (15) into equation (10) and minimize the deviation in the least squares sense similar to before. After some manipulation, the "best" $\bar{a}$ is obtained using the following equation 17:

$$\bar{a}_{best} = \bar{X}_C \cdot \bar{F}_C^T \cdot (\bar{F}_C \cdot \bar{F}_C^T)^{-1} (\bar{P}\text{'s constrained}) \quad (17)$$

where $\bar{X}_C = \bar{r} \cdot \bar{\bar{C}}$ is a 3×L matrix whose columns are the true XYZ values of each of the calibrations PSD's, and $\bar{F}_C = \bar{\bar{f}} \cdot \bar{\bar{C}}$ is a M×L matrix whose columns are the M responses of the sensors of the sensor system 30 to each of the calibration PSD's ($\bar{F}_C^T$ is its transpose). The error is obtained by inserting equation (17) into equation (10). Positing that equation (17) represents the best $\bar{a}$ in spite of the error $\bar{\Delta}$, then the error in chromaticity values may be expressed as:

$$\bar{G} = \bar{X}_C \cdot \left[\bar{I}^L - \bar{F}_C^T \cdot \left(\bar{F}_C \cdot \bar{F}_C^T\right)^{-1} \cdot \bar{F}_C\right] \cdot \bar{\alpha} + \left(\bar{r} - \bar{a}_{best} \cdot \bar{\bar{f}}\right) \cdot \bar{\Delta} \quad (18)$$

($\bar{P}$'s constrained)

The first term on the right hand side of equation (18) is the same as the right hand side of equation (14), but only considering the calibration functions. The second term on the right hand side of equation (18) therefore represents the deviation due to the measured PSD possibly deviating from being a linear combination of such a set of functions.

In many practical instances, the $\bar{a}_{best}$ obtained from equation (17) produces smaller deviations than that obtained from equation (13). It has been found, for example, that this is the case in a daylighting system in which the calibration functions are chosen to be some number of Planck functions at different temperatures. That this works well is due to the fact that natural light from the sky falls near the blackbody locus, whether that light is direct sunlight, Mie/Rayleigh scattered sunlight, and/or light scattered by clouds. It is worth noting that the Planck functions in the calibration set may include those for which temperatures are greater than the melting point of tungsten, a difficulty if performing a calibration with real light sources. Another example is a daylighting system augmented by one or more artificial light sources (e.g., white LEDs of various CCT, single colored LEDs, and/or fluorescent lamps).

Accordingly, in some embodiments, the calibration tables 38 for the lighting system 12 are calculated without using physically real light sources. Rather, once the spectral responsivities of the sensors of the sensor system 30 that are included in the sensor system 30 are known, a set of calibration functions is created for a constrained set of expected PSDs, in which each calibration function represents the spectra of a hypothetical calibration light source (which does not have to exist). Since the deviations of the results from the true chromaticity values is able to be determined, the calibration may therefore be tailored according to experimental conditions.

Using the dynamic calibration process gives better overall accuracy than conventional calibration procedures, because conventional calibration procedures are most accurate over a limited set of measurements, namely those for which the measured light has spectra similar to the calibration light sources. The lighting system 12 using the set of calibration tables 38 gives just as good accuracy in these cases, and better accuracy in all other cases. In addition, the procedure allows greater flexibility for any particular sensor system 30, as long as the raw data (sensor outputs) are available and the spectral responsivities of the sensors of the sensor system 30 are known.

In some embodiments, the sensor system 30 includes one or more commercially available optical color sensors. The sensors of the sensor system 30 may be arranged on a printed circuit board, with support electronics, and placed in an enclosure, with optics for routing the light-under-test to the sensor system 30 and at least one output pin for providing an output voltage representing the quantity Fs. The response of the sensor system 30 to input wavelengths is determined using a calibrated light source and spectrometer. This establishes the matrix $\bar{\bar{f}}$ needed to derive the synthetic calibration functions described above. The synthetic calibration functions are then used, during operation, to adjust the output of the sensor system 30, to enable the sensor system 30 to provide information about the chromaticity of the uncontrolled D light 20 more accurately than where a standard calibration process is used to interpret the output of the sensor system 30.

Determining Output Voltage of Tuner Module to Adjust Total S Light Chromaticity

To help understand operation of this aspect, a basic background on chromaticity theory is initially provided, mainly to establish the notation that is used in this section of the disclosure.

Light characterized by a Power Spectrum Density (PSD) function, $P(\lambda)$, has a corresponding set of chromaticity values which ultimately stem from the three tristimulus functions, conventionally designated $\bar{x}(\lambda), \bar{y}(\lambda), \bar{z}(\lambda)$. These functions are well-defined mathematically and correspond roughly to the responsivities of the three types of cones in the human eye. The so-called XYZ (uppercase) tristimulus values are defined as follows:

$$X = \int_0^\infty d\lambda P(\lambda)\bar{x}(\lambda) \tag{19}$$

$$Y = \int_0^\infty d\lambda P(\lambda)\bar{y}(\lambda) \tag{20}$$

$$Z = \int_0^\infty d\lambda P(\lambda)\bar{z}(\lambda) \tag{21}$$

The limits of integration are a formality. In practice they bound roughly the visible part of the spectrum, from about 360 nm to 830 nm.

The xy (lowercase) chromaticity coordinates are given by:

$$x = \frac{X}{X+Y+Z} = \frac{X}{S} \tag{22}$$

$$y = \frac{Y}{X+Y+Z} = \frac{Y}{S} \tag{23}$$

where S has been defined as: S=X+Y+Z. The above definitions serve to define the two dimensional xy chromaticity space. Although mathematically the space is infinite, there is a finite region corresponding to physically realizable light sources. The outer boundary of this region is defined by the curve swept out by the pure-color PSD functions, expressed by the Dirac delta functions $\delta(\lambda)$ for all $\lambda$. This will serve as a constraint in the analysis below, although it is not always explicitly included in all of the expressions.

To understand how the chromaticity of the total S light 18 of the lighting system 12 may be controlled, a background introduction will be provided to show that the chromaticity coordinates of a particular PSD is a linear combination of two other PSD's. Specifically, in this section it will be established that the chromaticity coordinates of the total PSD lies along a line in xy chromaticity space connecting those of the two PSD's of which it is composed, and how to establish the location of the total PSD's coordinates on that line.

Consider the following:

$$P = \alpha_1 P_1 + \alpha_2 P_2 \tag{24}$$

where $\alpha_1$ and $\alpha_2$ are any real-valued constants. P is considered the total PSD, and $P_1$ and $P_2$ are the individual parts of which it is composed (although it could easily be that the roles of these three PSD's are interchanged). Denote the xy chromaticity coordinates of the three PSD's by (x, y), $(x_1, y_1)$, and $(x_2, y_2)$.

Now consider the slope, $\sigma$, of the line that passes through (x, y) and $(x_1, y_1)$:

$$\sigma = \frac{y - y_1}{x - x_1} \tag{25}$$

From the definitions of x and y in equations (22) and (23) this becomes $$\sigma = \frac{\frac{Y}{S} - \frac{Y_1}{S_1}}{\frac{X}{S} - \frac{X_1}{S_1}} = \frac{YS_1 - Y_1 S}{XS_1 - X_1 S} \tag{26}$$

From the linearity of the X, Y, Z with respect to P (see equations (19)-(21)):

$$X = \alpha_1 X_1 + \alpha_2 X_2$$

$$Y = \alpha_1 Y_1 + \alpha_2 Y_2$$

$$S = \alpha_1 S_1 + \alpha_2 S_2 \tag{27}$$

Substituting equation (27) into equation (26) and rearranging gives:

$$\sigma = \frac{S_1 Y_2 - S_2 Y_1}{S_1 X_2 - S_2 X_1} \tag{28}$$

Thus, the slope is a number dependent on chromaticity quantities at the endpoints $(x_1, y_1)$ and $(x_2, y_2)$. Specifically, it is independent of $\alpha_1$ and $\alpha_2$, the amounts of $P_1$ and $P_2$ that make up P. For example, choosing $\alpha_1 = 0$ and $\alpha_2 = 1$, for which $P = P_2$, $\sigma$ is then interpreted as the slope of the line connecting points $(x_1, y_1)$ and $(x_2, y_2)$. Therefore, this is the slope for any choices of $\alpha_1$ and $\alpha_2$.

To establish the location of the point (x, y) along the line connecting $(x_1, y_1)$ and $(x_2, y_2)$, consider the following:

$$f = \frac{x - x_1}{x_2 - x_1} \tag{29}$$

which is the fractional distance from x to $x_1$ relative to the total distance between $x_2$ and $x_1$. The same value of $f$ results if we replace the x's with y's. This may be seen by making the substitutions $x_2 - x_1 = (y_2 - y_1)/\sigma$ and $x - x_1 = (y - y_1)/\sigma$. Using the definition of x, this may be rewritten as:

$$f = \left( \frac{XS_1 - X_1 S}{X_2 S_1 - X_1 S_2} \right) \frac{S_2}{S} \tag{30}$$

Utilizing again the linearity properties shown by equation (27), this becomes:

$$f = \frac{\alpha_2 S_2}{\alpha_1 S_1 + \alpha_2 S_2} = \frac{\alpha_2 S_2}{S} = \frac{1}{1 + \frac{\alpha_1 S_1}{\alpha_2 S_2}} \tag{31}$$

Thus, the location depends not only on the ratio of the amounts of $P_1$ and $P_2$, but also on the ratio of their respective S values. The latter property implies that the location may be different even for the same two points $(x_1, y_1)$ $(x_2, y_2)$, since the mapping from XYZ to xy is not unique. Of course, it is possible to imagine normalized values for $P_1$ and $P_2$ (e.g., $S_1 = 1$ and $S_2 = 1$) and consider all variations of their intensities to be given by the $\alpha$ factors.

Since $S_1 \geq 0$ and $S_2 \geq 0$, and if we also have $\alpha_1 \geq 0$ and $\alpha_2 \geq 0$ then (31) implies $$0 \leq f \leq 1 \text{ for } \alpha_{1,2} \geq 0 \tag{32}$$

In this case it is envisaged that P is composed of $P_1$ and $P_2$, in the sense that the total S light 18 is achieved by adding some fraction of the light of each (instead of subtracting out light from one to get the total). Therefore, the chromaticity coordinate of the total lies in between the chromaticity coordinates of the individual parts. From equation (31) it is possible to determine that:

if $\alpha_2 = 0$ (P is all $P_1$ of any intensity) then $f=0$ and the chromaticity point is at $(x_1, y_1)$.

If $\alpha_1 = 0$ (P is all $P_2$ of any intensity) then $f=1$ and the chromaticity point is at $(x_2, y_2)$.

There may be situations in which either of the $\alpha$ factors is negative, as long as P>0. (Both $\alpha$'s cannot be negative because then P would be negative, which is not allowed.) In this case $f$ may of course be greater than 1 or less than zero. The interpretation would be that a certain amount of the constituent light is subtracted out. In an actual application, this is useful if the total S light 18 is already known to include a certain amount of one of the constituents ($\alpha_1 P_1$, say) and it is desirable to subtract out an amount $\alpha_1' P_1 \leq \alpha_1 P_1$.

Suppose that a daylight PSD has been measured, and the lighting system 12 has determined its xy chromaticity coordinates. As discussed above, it is desirable for the lighting system 12 to adjust the controllable light sources 16 so that the total S light 18 provided by the lighting system 12 meets the target chromaticity point. In particular, the tuner module 44 needs to adjust the output signals $\nabla$ to cause the driver 34 to control the controllable light sources 16, for example to increase or decrease the amount of light produced by one or more of the controllable light sources 16. Since the controllable light sources 16 produce light with known xy coordinates, this portion of the disclosure explains how to determine how much light to add from one or more control PSD's (controllable light sources 16 with known chromaticity xy coordinates) so that the chromaticity point of the total PSD (total S light 18) is at a particular target location in xy space.

Figure 4:
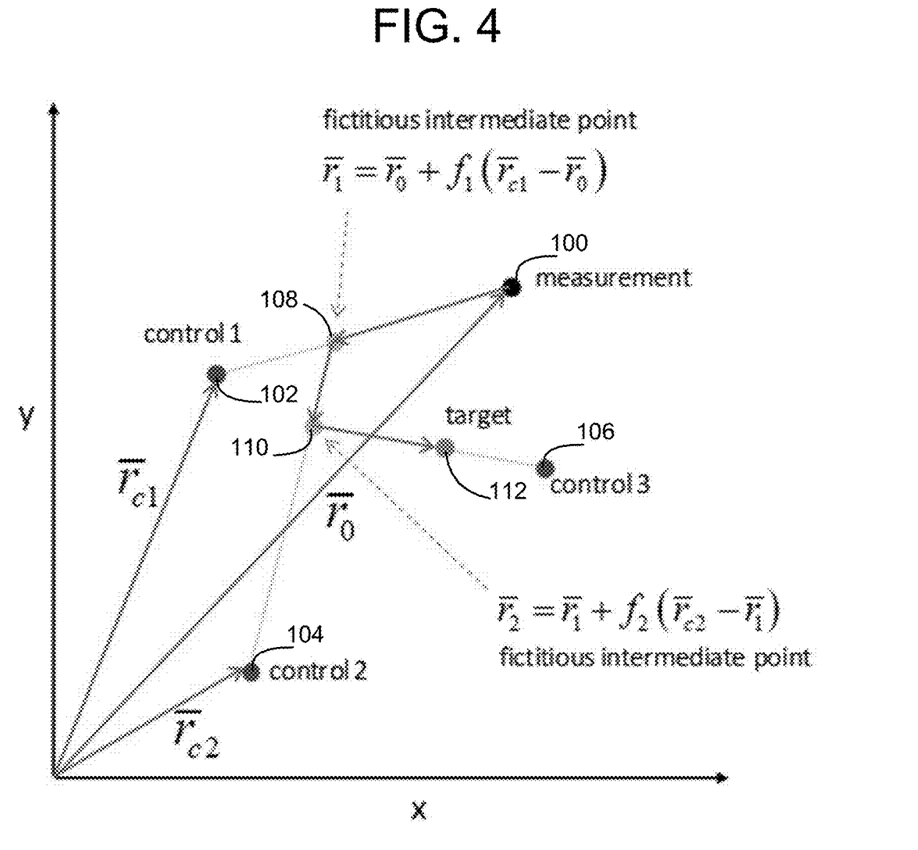
FIG. 4-5 are xy chromaticity space graphs illustrating adjustment of light provided by an example lighting system, in accordance with some embodiments of the present disclosure.

The problem may be represented pictorially, as shown in FIG. 4, which is a schematic diagram of the xy control problem. The measured PSD 100 has xy chromaticity coordinate $\bar{r}_0$. As shown in FIG. 4, in this hypothetical example lighting system 12, it is assumed that there are three controllable light sources 16. Each controllable light source 16 is configured to produce light having a given xy chromaticity. The chromaticity coordinates of the three controllable light sources 16 are labeled 102, 104, and 106 in FIG. 4. Although FIG. 4 shows the xy chromaticity coordinates of three controllable light sources 16, of course there could be any number of controllable light sources 16.

The known xy chromaticity coordinates of the controllable light sources 16 will be referred to herein as control points. The control points are denoted $\bar{r}_{cn}$, where n is an integer index representing the particular control. The control points are ordered arbitrarily. As discussed herein, a given control "pulls" the chromaticity point along a line between the last xy position and the xy position of that control point. The distance it pulls is given by equation (31), which is the fraction of the total distance between previous point and the control. In this case, the subscript '1' in equation (31) refers to the previous xy point and '2' refers to the control point. (The previous point contains the accumulation of all points prior to it.) Each control pulls the light to a new fictitious location (dots 108, 110 in FIG. 4), until the total chromaticity of the total S light 18 reaches the target 112 chromaticity. In principle, if the S values for the control points are known, which is assumed, then determining the $\alpha$ values will specify the amounts of control PSD's to add. Stated differently, determining the $\alpha$ values of the controllable light sources 16 enables the relative intensity of the controllable light sources 16 to be determined that will result in an operating state of lighting system 12 in which the total S light 18 provided by the lighting system 12 matches the target chromaticity.

By inspection of the geometry, the expression for the $n^{th}$ intermediate point may be written in terms of the $(n-1)^{th}$ intermediate point and the $n^{th}$ control point, as follows:

$$\bar{r}_n = \bar{r}_{n-1} + f_n(\bar{r}_{cn} - \bar{r}_{n-1}) \tag{33}$$

where
n=1, 2, . . . , N
N is the number of controls;
$\bar{r}_0$ is the (known) measurement point; and
$\bar{r}_N$ is the (specified) target point.
The $f_n$ are $$f_n = \frac{\alpha_{cn} S_{cn}}{\sum_{k=0}^{n} \alpha_{ck} S_{ck}} \tag{34}$$

where $S_{ck} = X_{ck} + Y_{ck} + Z_{ck}$ ('S' value for the $k^{th}$ control point), and $\alpha_{ck}$ is the fraction of the $k^{th}$ control PSD to be added (may be any number greater than or equal to zero).

Starting from the first expression in the set of N expressions in equation (33), each may be inserted into its successor in the sequence. The result is one expression (a vector equation) without the intermediate point locations, $\bar{r}_1, \ldots, _{N-1}$ ($\bar{r}_N$ is the target point and is not intermediate), as follows:

$$\bar{r}_N = \bar{r}_0 \prod_{k=1}^{N}(1-f_k) + \bar{r}_{c1} f_1 \prod_{k=2}^{N}(1-f_k) + \bar{r}_{c2} f_2 \prod_{k=3}^{N}(1-f_k) + \ldots + \bar{r}_{cN} f_N \tag{35}$$

This represents two equations (each vector has two components), but there are N unknowns ($f_{1 \ldots N}$), which of course indicates that the system is under-determined for N>2. Thus, as expected from looking at the geometry, only two suitable controls are needed for a unique solution. It should be noted that there are instances where the two controls do not provide a suitable solution because the control points are located such that it is necessary to subtract control light (negative $\alpha$). Hence, the need for two suitable controls. In essence, this may be implemented based on the following N additional constraints: ($\alpha_{c,1 \ldots N} > 0$ or, similarly, $0 \leq f_n \leq 1$).

In a lighting system 12 having two controllable light sources 16, the two equations are:

$$x_N = x_0(1-f_1)(1-f_2) + x_{c1} f_1(1-f_2) + x_{c2} f_2$$

$$y_N = y_0(1-f_1)(1-f_2) + y_{c1} f_1(1-f_2) + y_{c2} f_2 \tag{36}$$

where the subscript N, which equals 2, is left in as a reminder that $(x_N, y_N)$ are the known target chromaticity coordinates. This system is quadratic in the unknowns in that it has quadratic terms of the form $f_1 f_2$. However, it may be made into a linear system, with respect to different variables, by subtracting $x_{c1}(1-f_2) + x_{c2}$ from both sides of the 'x' equation, and similarly for the 'y' equation. After a bit of manipulation, this gives:

$$(x_o - x_{c1})u + (x_{c1} - x_{c2})v = x_N - x_{c2}$$

$$(y_o - y_{c1})u + (y_{c1} - y_{c2})v = y_N - y_{c2} \tag{37}$$

where $$u = (1 - f_1)(1 - f_2)$$

$$v = (1 - f_2) \tag{38}$$

The system described by equation (37) is linear with respect to u and v, and therefore may be solved for those variables. Unknowns $f_1$ and $f_2$ are then determined from u and v. The answer is $$f_1 = 1 - \frac{u}{v} \tag{39}$$

$$f_2 = 1 - v$$

where $$u = \frac{(x_N - x_{c2})(y_{c1} - y_{c2}) - (y_N - x_{c2})(x_{c1} - x_{c2})}{(x_0 - x_{c1})(y_{c1} - y_{c2}) - (y_0 - y_{c1})(x_{c1} - x_{c2})} \tag{40}$$

$$v = \frac{(x_0 - x_{c1})(y_N - y_{c2}) - (x_N - x_{c2})(y_0 - y_{c1})}{(x_0 - x_{c1})(y_{c1} - y_{c2}) - (y_0 - y_{c1})(x_{c1} - x_{c2})}$$

The $f_{1,2}$ are related to the $\alpha_{c1,c2}$ as follows:

$$f_1 = \frac{\alpha_{c1} S_{c1}}{\alpha_{c1} S_{c1} + S_0} \tag{41}$$

$$f_2 = \frac{\alpha_{c2} S_{c2}}{\alpha_{c2} S_{c2} + \alpha_{c1} S_{c1} + S_0}$$

where the quantity has been set to $\alpha_0 = 1$ (i.e., the control PSD's are normalized to the daylight PSD). The two quantities $\alpha_{c1,c2}$ are then determined by inverting equation (41), with the result:

$$\frac{\alpha_{c1} S_{c1}}{\alpha_0 S_0} = \frac{f_1}{1 - f_1} \tag{42}$$

$$\frac{\alpha_{c2} S_{c2}}{\alpha_0 S_0} = \frac{f_2}{(1 - f_1)(1 - f_2)}$$

Figure 5:
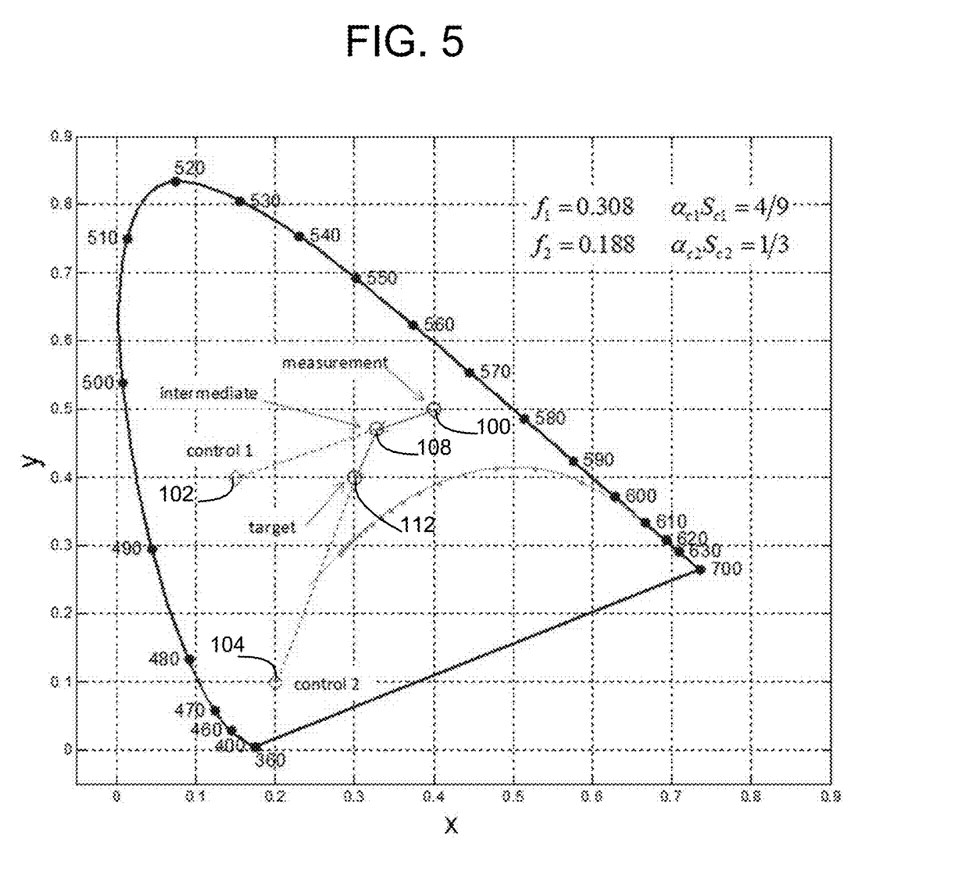

FIG. 5 is a graph showing a demonstration of the solution for two controllable light sources 16. The initial chromaticity (e.g., daylight) is at the location labeled "measurement". The two control chromaticities are at the locations labeled "control 1" and "control 2". The solution ($f_1$ and $f_2$ values and $\alpha_{c1,c2}$ values for both controls) are listed at the upper right, and the arrows indicate how each of the controls moves the chromaticity, first to an intermediate point, and then to the target chromaticity.

It is noted that the above formulation applies to situations in which one or more of the $f$ values are less than zero or greater than one. This would imply that the corresponding $\alpha_c$ value for the control were negative. This applies to the situation in which the initial measured light was already composed of some amount of the control(s) in question. The negative $\alpha_c$ value is then interpreted as subtracting out some of the control that is already present. Of course, it is not possible to subtract out more than what is there, and, If this is the result, then the solution is unphysical. In this instance, different controls would be needed for achieving the desired target chromaticity point.

In a system with an arbitrary number N of controllable light sources 16, the system described by equation (35) may be made linear with respect to a new set of variables by subtracting the following quantity from both sides (the following is for the 'x' equation, but a similar form applies to the 'y'):

$$x_{cN} + (1 - f_N)x_{c,(N-1)} + \tag{43}$$

$$(1 - f_N)(1 - f_{N-1})x_{c,(N-2)} + \ldots + \left[\prod_{k=2}^{N}(1 - f_k)\right]x_{c1}$$

The resulting equations are $$(x_o - x_{c1})u_N + (x_{c1} - x_{c2})u_{N-1} + \ldots + (x_{c,N-1} - x_{c,N})u_1 = x_N - x_{c,N}$$

$$(y_o - y_{c1})u_N + (y_{c1} - y_{c2})u_{N-1} + \ldots + (y_{c,N-1} - y_{c,N})u_1 = y_N - y_{c,N} \tag{44}$$

where the N independent variables are $$u_1 = 1 - f_1$$

$$u_2 = (1 - f_1)(1 - f_2)$$

$$\ldots$$

$$u_N = (1 - f_1)(1 - f_2) \ldots (1 - f_N) \tag{45}$$

The solution to equation (44) falls within an N−2 dimensional subspace of the N dimensional $\bar{u}$ space. Once a particular point in that subspace is chosen, the $f$ values are found in straightforward fashion from equation (45). Specifically, initially $f_1$ is obtained from the first line of the system described in equation (45). The result is then inserted into the second line of the system described in equation (45) to obtain $f_2$, and so on down the chain. The $\alpha$ values are as follows:

$$\frac{\alpha_{c1} S_{c1}}{\alpha_0 S_0} = \frac{f_1}{1 - f_1} \tag{46}$$

$$\frac{\alpha_{c2} S_{c2}}{\alpha_0 S_0} = \frac{f_2}{(1 - f_1)(1 - f_2)}$$

$$\vdots$$

$$\frac{\alpha_{cN} S_{cN}}{\alpha_0 S_0} = \frac{f_N}{(1 - f_1)(1 - f_2) \ldots (1 - f_N)}$$

In some embodiments, this formulation is used as a basis for calculations that are implemented by the tuner module 44 to determine how the controllable light sources 16 should be adjusted to cause the chromaticity of the total S light 18 to match the target chromaticity for the lighting system 12. As daylight conditions change, the tuner module 44 adjusts the controllable light sources 16 by increasing or decreasing the contribution of these controllable light sources 16 to the overall light provided by the lighting system 12, so that the chromaticity of the total S light continues to match the target chromaticity for the lighting system 12 even as the chromaticity of the uncontrolled D light 20 provided by the uncontrollable light sources 14 varies with time.

Specifically, using this process, the tuner module 44 is able to control the x)) chromaticity coordinates of light produced by a set of controllable light sources 16, where the chromaticity coordinates of the individual controllable light sources 16 is known, and the relative intensity of at least some of the controllable light sources 16 is able to be adjusted. In particular, in a daylighting system with two controllable light sources 16, the tuner module 44 may use the known chromaticity of the controllable light sources 16 and the measured chromaticity of the measured total S light 18 to adjust the intensity of the controllable light sources 16 to achieve a target chromaticity for the light provided by the lighting system 12. The same process may be used to adjust the overall chromaticity of the light provided by the lighting system 12 using more than two controllable light sources 16, however depending on the particular implementation, it is possible that the solution is not unique, i.e. the tuner module 44 may be able to achieve the target chromaticity in multiple ways.

The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more non-transitory tangible computer-readable storage medium readable by the processor (including volatile and non-volatile memory and/or storage elements), one or more input devices, and/or one or more output devices.

The computer program(s) may be implemented using one or more high level procedural or object-oriented programming languages to communicate with a computer system; however, the program(s) may be implemented in assembly or machine language, if desired. The language may be compiled or interpreted.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including", and "having" are intended to be inclusive and mean that there may be additional elements other than the listed elements.

Although the methods and systems have been described relative to specific embodiments thereof, they are not so limited. Many modifications and variations may become apparent in light of the above teachings. Many additional changes in the details, materials, and arrangement of parts, herein described and illustrated, may be made by those skilled in the art. A number of implementations have been described. Nevertheless, it will be understood that additional modifications may be made without departing from the scope of the inventive concepts described herein, and, accordingly, other implementations are within the scope of the following claims.

What is claimed is:

1. A method of controlling chromaticity of total light in a space, comprising:
   generating, by a sensor system monitoring a space, a detected light signal comprising a controlled light signal component due to light produced by a plurality of controllable light sources illuminating the space and an uncontrolled light signal component due to light produced by at least one uncontrollable light source not under the control of the lighting system;
   isolating the uncontrolled light signal component from the detected light signal based on electrical properties currently being used to control the plurality of controllable light sources;
   dynamically calibrating the uncontrolled light signal component using a calibration table that is selected based on the uncontrolled light signal component; and
   adjusting the electrical properties of the plurality of controllable light sources to approximate a target chromaticity based on the calibrated uncontrolled light signal component and the controlled light signal component.

2. The method of claim 1, wherein at least two of the controllable light sources in the plurality of controllable light sources have different xy chromaticities.

3. The method of claim 1, wherein isolating the uncontrolled light signal component from the detected light signal comprises:
   determining a chromaticity of the plurality of controllable light sources from the electric properties currently being used to control the plurality of controllable light sources;
   determining the controlled light signal component based on the chromaticity of the plurality of controllable light sources; and
   subtracting the controlled light signal component from the detected light signal.

4. The method of claim 3, wherein a mapping table stores a plurality of electric properties that may be applied to the plurality of controllable light sources and the resultant chromaticity.

5. The method of claim 1, wherein the calibration table is selected from a plurality of calibration tables, each calibration table comprising a chromatic sensing response of the sensor system due to a different uncontrolled light signal component.

6. The method of claim 5, wherein the plurality of calibration tables are formed using calibration functions representing non-physically real calibration sources.

7. The method of claim 6, wherein the calibration functions are Planck functions at different temperatures.

8. The method of claim 1, wherein dynamically calibrating the uncontrolled light signal component further comprises determining an approximate power spectrum density of the uncontrolled light from uncontrolled light signal component.

9. The method of claim 8, wherein the selected calibration table is formed using a calibration function having a power spectrum density similar to the determined approximate power spectrum density of the uncontrolled light.

10. The method of claim 1, wherein the at least one uncontrollable light source comprises the sun.

11. A lighting system, comprising:
    a plurality of controllable light sources illuminating a space;
    a sensor system configured to generate a detected light signal comprising a controlled light signal component due to light produced by the plurality of controllable light sources and an uncontrolled light signal component due to light produced by at least one uncontrollable light source not under the control of the lighting system; and
    a processor coupled to the plurality of controllable light sources and the sensor system, the processor configured to:
    isolate the uncontrolled light signal component from the detected light signal based on electrical properties currently being used to control the plurality of controllable light sources;

dynamically calibrate the uncontrolled light signal component using a calibration table that is selected based on the uncontrolled light signal component; and adjust the electrical properties of the plurality of controllable light sources to approximate a target chromaticity based on the calibrated uncontrolled light signal component and the controlled light signal component.

12. The system of claim 11, wherein at least two of the controllable light sources in the plurality of controllable light sources have different xy chromaticities.

13. The system of claim 11, wherein the processor is configured to isolate the uncontrolled light signal component from the detected light signal by:

determining a chromaticity of the plurality of controllable light sources from the electric properties currently being used to control the plurality of controllable light sources;

determining the controlled light signal component based on the chromaticity of the plurality of controllable light sources; and subtracting the controlled light signal component from the detected light signal.

14. The system of claim 13, wherein the system further comprises a memory storing a mapping table comprising a plurality of electric properties that may be applied to the plurality of controllable light sources and the resultant chromaticity.

15. The system of claim 11, wherein the calibration table is selected from a plurality of calibration tables, each calibration table comprising a chromatic sensing response of the sensor system due to a different uncontrolled light signal component.

16. The system of claim 15, wherein the plurality of calibration tables are formed using calibration functions representing non-physically real calibration sources.

17. The system of claim 16, wherein the calibration functions are Planck functions at different temperatures.

18. The system of claim 11, wherein the processor is configured to dynamically calibrate the uncontrolled light signal component by determining an approximate power spectrum density of the uncontrolled light from uncontrolled light signal component.

19. The system of claim 18, wherein the selected calibration table is formed using a calibration function having a power spectrum density similar to the determined approximate power spectrum density of the uncontrolled light.

20. The system of claim 11, wherein the at least one uncontrollable light source comprises the sun.

* * * * *